US005553373A

United States Patent [19]

Sprayberry

[11] Patent Number: 5,553,373

[45] Date of Patent: Sep. 10, 1996

[54] PHOTOELECTRIC CONTROL MODULE INSTALLATION DEVICE

[76] Inventor: James M. Sprayberry, 1094 Jennings Rd., Sylacauga, Ala. 35150

[21] Appl. No.: 344,733

[22] Filed: Nov. 23, 1994

[51] Int. Cl.$^6$ .......... B23P 19/04

[52] U.S. Cl. .......... 29/758; 29/278; 29/764; 81/53.11; 81/53.12

[58] Field of Search .......... 29/278, 279, 758, 29/764, 705; 81/53.1, 53.11, 53.12; 294/19.1

[56] References Cited

U.S. PATENT DOCUMENTS

| | | | |
|---|---|---|---|
| 558,573 | 4/1896 | Smith | 81/53.12 |
| 1,258,430 | 3/1918 | Morris | 81/53.11 |
| 1,655,979 | 1/1928 | Watkins | 81/53.11 |
| 2,516,650 | 7/1950 | Shapiro et al. | 81/53.11 X |
| 2,573,002 | 10/1951 | Foster | 81/53.12 |
| 2,634,999 | 4/1953 | Fjeld | 81/53.11 |
| 5,317,939 | 6/1994 | Marinesa | 81/53.11 |
| 5,322,334 | 6/1994 | Hammer | 294/19.1 |

FOREIGN PATENT DOCUMENTS

| | | | |
|---|---|---|---|
| 671742 | 10/1963 | Canada | 81/53.11 |
| 296178 | 2/1971 | U.S.S.R. | 29/278 |

*Primary Examiner*—Peter Vo

[57] ABSTRACT

A maintenance device for the servicing of overhead modular photoelectric control switches, from ground level. This invention integrates the means to functionally test, remove, and install photoelectric control switch modules, normally associated with outdoor lighting. Alternatively, the device can remove and install high intensity light bulbs. The device comprises a pair of rotatable contracting grips, at one end. The grips respond to rotation of a cam, which also attaches the opposite end of the grips to a flex-head ratchet wrench. The wrench selectively imparts either clockwise or counterclockwise drive to the cam and, therefore, the grips. The opposite, or handle, end of the ratchet wrench is in sequence connected, via a universal attaching head, to a telescopic pole. When the grips are slided over a modular photoelectric control switch, the amount light striking its sensor is reduced, causing a functional module to switch on. If it fails to switch on, the module has malfunctioned and must be replaced. Removal is accomplished by short alternating lateral movement of the telescopic pole, causing the attached ratchet wrench to impart rotation of the cam and grips. Rotation frees the gripped module from its receptical and it is lowered to ground, using the telescopic pole, and manually removed from the grips. Installation is the reverse operation of removal.

3 Claims, 1 Drawing Sheet

PHOTOELECTRIC CONTROL MODULE INSTALLATION DEVICE

BACKGROUND OF INVENTION

1. Field of Invention

This invention relates generally to maintenance and repair devices used to test, service, and replace switched electrical lighting, and other electrical devices, that are controlled by modular photoelectric control switches.

2. Description of Prior Art

Modular photoelectric control switches, commonly called photoelectric cells, are used to control a wide variety of electrical devices. The most commom devices are lights, which are sometimes referred to as dusk-til-dawn lights, such as street lights and advertising sign lights. Most any other electrical device which is desired to be switched on, or off, at the advent of night or day may utilize modular photoelectric control switches. For examples, security sensors and heating and airconditioning units may also be switched. Modular photoelectric control switches will automatically switch in correlation to a design threshold of the switch and the amount of light striking its photoelectric sensor.

Most modular photoelectric control switches are located overhead, above human reach. This reduces interference with the amount of light striking the sensor. When it is known or suspected that modular photoelectric control switch has malfunctioned, a repairman must elevate to the switch location to identify the problem and take corrective action. Currently the module is serviced by elevating the repairman by means of manual climbing, the use of hydraulic lifts, and climbing with the assistance of ladders, or other climbing equipment. The use of such elevating means, to access the module by hand, is either costly or timely inefficient, or both, and is often unsafe. A means for repairmen to safely and efficiently test and repair overhead modular photoelectric control switches, from ground level, is needed.

That need is met by this invention, herein called, the modular photoelectric control installation device. By attaching this device to a standard telescopic pole, alternatively referred to as a long pole, a repairman can perform all normally required test and maintenance of modular photoelectric control switches, from ground level. Telescopic poles are associated with a variety of overhead electrical maintenance tasks, by use of various attached devices. Such specialized attachments may provide a means to replace fuses, cut cables, replace cotter keys, install electrical insulators, disconnect hot lines, and dispense from aerosol cans. Another attachment removes the bases of broken bulbs. Some of the most common long pole attachments are especially made to replace defective overhead lightbulbs. There are several types of bulb changers available commercially. One is commonly called the McGill lamp changer. It should be noted here, that one embodiment of the current invention can also change bulbs.

But, there has not been available a reliable, efficient, and safe means of testing and replacing the modular photoelectric switches. Yet, most switches are connected to, and usually located close to, a lightbulb. Usually, the bulb is a high intensity sodium, or mercury vapor bulb, when used in conjunction with a modular photoelectric control switch. Most commonly the switch and bulb are co-located in the same fixture, such as in a street light. Unless there is physical damage to either the bulb or the module, it is not normally possible to visually determine which component has malfunctioned. Basically, the same is true when the module is used with nonlight emitting components, because most repairs are made during the daylight hours. Therefore, electric current in the module would normally be switched off. Simply put, the appearence of both components will often be the same, even if both the bulb and the module were otherwise known to be defective.

In unknown situations, most repairmen simply proceed with a trial-and-error solution by replacing the bulb by means of a long pole attachment. If the problem subsequently proves, by deduction, to be located in the module the repairman will return and somehow gain hand access to the module. There exist a long pole attachment which will test the module. It is basically an opaque bonnet, which is lowered over the sensor of the module. Thereby, the light level is lowered and causes the module to switch. However, this attachment is not widely used. Unless both components function when the bonnet is used, it has no further utility in identifying and correcting the malfunction.

The modular photoelectric control installation device, however, performs the same test functions as the bonnet device. Furthermore, as necessary, it can subsequently remove and replace the module. Most new modular photoelectric control devices are designed to briefly self-test, regardless of light levels, by switching when initially installed. At this point in the test and repair process, by using the current invention, the repairman can deductively conclude which, if any, components are still defective. Yet, the repairmam has not been forced to use an extended trial-and-error repair method. Nor has it been necessary to expend the time, expense, and risk of working above ground level.

An assortment of hand tools have been adapted for use with the telescopic poles and are interchanged via a universal head. Such tools include hammers, screwdrivers, socket wrenches, and saws. These tools are used, within practical limitations, to make overhead electrical repairs. They are manipulated with the telescopic poles, basically as an extension of the hand and arm. Specialized interchaneable devices have also been adapted for overhead work with the telescopic pole. Some examples include insulator clamps and fuse pullers. These function mechanically when the repairman twist the pole with wrist action. Both hand tools and specialized devices have also been devised, that are activated by cables running the length of the telescopic pole.

Pulling the cable might depress a lever to activate an aerosol can button, or activate the release lever on vice grip pliers. Cable activatation, however, increases demands on manual dexterity and complicate the device. Even given the vast variety of tools and specialized devices adapted to pole use, none can safely, reliably, and efficiently complete the tasks testing and replacing modular photoelectric control switches. None prior to the current invention. The major reasons for the prior situation are largely related to both the design and construction of the photoelectric control switches.

Modular photoelectric control switches can vary somewhat in size and shape. However, most are approximately the size of a small apple. Most have either a basically cylindrical or truncated conical shape. The current invention adjusts to all known shapes and sizes. Nearly all control switches are encased with hard plastic, and similar materials, with smooth surfaces. The surfaces tend to create slippage of gripping members. If additional pressure is applied to the relatively small surface area, to overcome slippage, the case might become damaged. The sensor portion of the case is the most susceptible to damage by either excessive pressure or slippage. Slight damage to the case may merely reduce the effectiveness of control switch. More severe damage can produce an electrical shock hazard to a repairman.

Near all modular photoelectric control switches are slightly flared around the circumference of the base. The flare serves as a weather collar, when seated into the standardized power recepticle. As a module, photoelectrical switches must be plugged into the standardized power recepticle and twisted to lock them in position. This is accomplished by inserting the standardized three-pronged electrical contacts, located in the base of the control switch, into recepticle and twisting it approximately thirty degrees. Often the contacts become corroded, fused, or bent. These situations increase the amount of force needed to remove and install the module. Since the required force is exerted on the case of the photoelectric switch, it is critical that applied force not damage the case. The current invention dissipates pressure over a large portion of the case surface and, therefore, negates slippage between itself and the case.

Another difficulty overcome by the current invention is that of keeping the control switch case gripped, when it is lowered to groung level, or raised up. At times the distance exceeds thirty feet. But, inherent in the mechanical functioning of the current invention is its ability to maintain a constant pressure with a gripping member. Maintaining positive control during removal, will greatly assist positioning a control switch during installation. Additionally, embodiment of many pole adapted devices restrict the locations from which a repairman may perform an associated task. Some rejected embodiments, as related to the current invention, had similar disadvantages. However, the final embodiment of the current invention has no such restriction. The current invention is omnidirectional, imposing no location restrictions on the repairman. In arriving at a final, and functional, embodiment of the current invention, many existing gripping-type devices and principles were discarded as unusable. Included were devices incorporating box end ratchets, stud extractors, basin wrenches, slip and locknut wrenches, screw-type flare tools, pipe and other types of adjustable wrenches. As well as, screw-type clamps, including pipe cutters and gear pullers. Piston ring compression sleeves were also rejected as unsuitable. A suitable device has a near equal capability to act upon the control switch in opposing directions, without slippage. That is, to push and pull, to lift and to lower, and to twist right and left. Hence, the embodiment of the current invention.

Finally, the current invention can be remotely disconnected from the the telescopic long pole whenever desired, or when required by emergency situations. This capability is not found in other specialized devices associated with telescopic long poles. Rather, it is a unique safety feature of the current invention.

SUMMARY OF THE INVENTION

It is an objective of this invention to provide a product which is capable of both removing and installing, from ground level, modular photoelectric control switches that are located overhead.

It is an objective of this invention to provide a product to test the functioning of overhead photoelectric control switches, and indirectly, their associated electrical devices, without the necessity of elevating a repairman.

It is an objective of this invention to provide a product which reduces time, effort, and risk of hands-on testing and replacing overhead modular photoelectric control switches by integrating a test and replacement capability into an entity.

It is an objective of this invention to provide a product, which when conjuncted with a telescopic long pole, provides a cableless remote capability to test and replace overhead photoelectric control switches and bulbs with one entity.

It is an objective of this invention to provide a product which allows a repairman omnidirectional remote access to overhead photoelectric control switches, unless access is otherwise obstructed.

It is an objective of this invention to provide a product which will adjust to variously existing shapes and sizes of modular photoelectric control switches, yet maintain its effectiveness as a tester and installer.

It is an objective of this invention to provide a product which can maintain near equal effectiveness while imparting directional force in one direction and in a reciprocal direction.

This is a necessary objective related to efficiency when installation is the reverse of removal.

It is an objective of this invention to provide a product which, in one anticipated embodiment, incorporates a limited integral capability to replace light bulbs, yet retains all capabilities to test and service modular photoelectric control switches.

It is an objective of this invention to eliminate, to practical extents, above ground level test and repair of photoelectic control switches. Put another way, this is a safety objective to reduce injury primarily from falls and from electric shock from contact with known, or unknown, electrically energized objects. Nevertheless, it is logical to anticipate that this invention will also be used by repairman working from elevated worksites, as work conditions and tasks may require.

LIST OF REFERENCE NUMERALS

Figure 1:
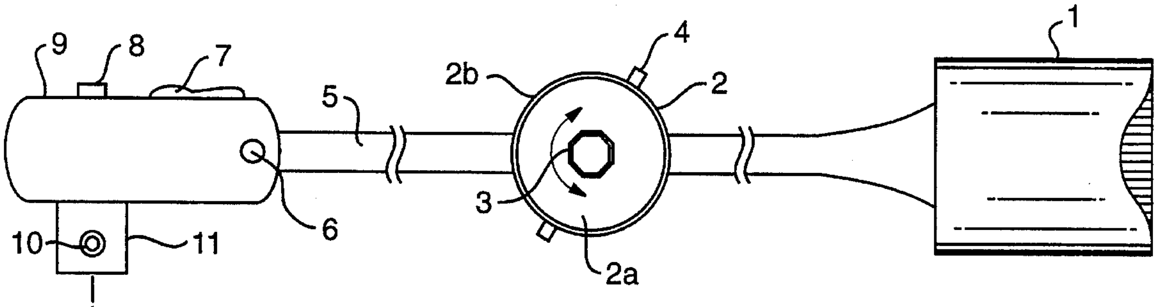
FIG. 1 is a side perspective view of a ratchet wrench, showing that the base of said wrench handle is attached to the tip of a telescopic long pole, via a universal attaching head, wherein the telescopic pole, the universal head, and the ratchet form the drive member of the current invention, and showing the point of attachment of the drive member to the gripping member. Said attachment thereby forming the extended integral device of the current invention.
Figure 1:
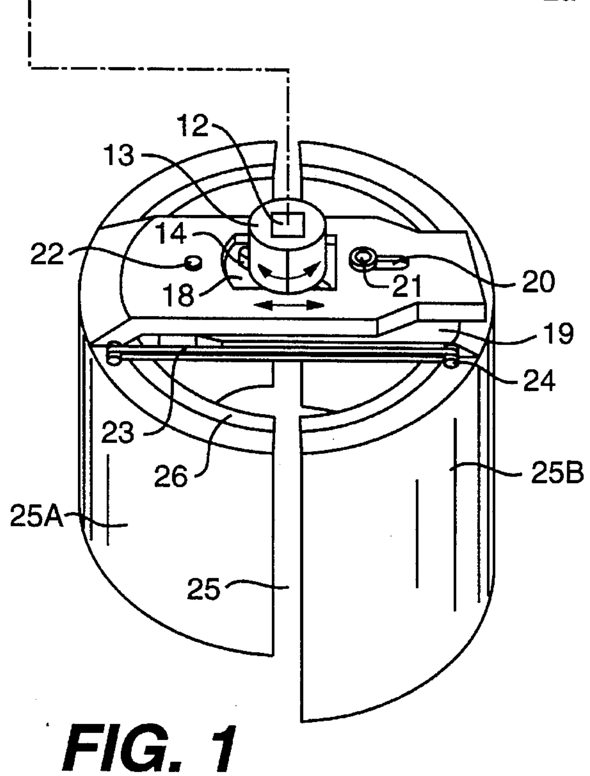

1 telescopic pole
2 universal attaching head
2A left half
2B right half
3 bolt
4 wingnut
5 handle 6 flex-pivot pin
7 reverse lever
8 quick-release button
9 ratchet wrench
10 locking ball
11 ratchet drive
12 socket cavity
13 socket drive
14 barcam
15 shaft
16 flatwasher
17 locknut
18 openings
19 overlapping plates
20 slot
21 rivet
22 hole
23 contractor
24 stud
25 grips
25A front grip
25B rear grip
26 lining

DESCRIPTION OF THE PREFERRED EMBODIMENT

Referring to FIG. 1 shows in detail one embodiment of the photoelectric control module installation device. Extending linearly from the tip end of a telescopic pole 1 is a universal attaching head 2. Universal attaching head 2 comprises two similar opposing halves which are joined rigidly by means of a recessed bolt 3. Bolt 3 is passed through the center of both the right half 2A and left half 2B. A wingnut 4 secures the joining of the right half 2A and left half 2B, by attaching to bolt 3 on the outer surface of right half 2B. The inner surfaces of halves 2A and 2B have a series of mated splines around their circumference. When wingnut 4 is tightened, the mated splines of halves 2A and 2B are meshed and will not slip.

Although forming a single entity, when joined, the left half 2A of the universal attaching head 2 is directly affixed to telescopic long pole 1. The right half 2B is permanently affixed to whatever device is being attached to the telescopic pole 1, via the universal attaching head 2. In respect to the current device, the attached device is a ratchet wrench 9, having a handle 5. The base end of handle 5 comprises the right half 2B of universal attaching head 2. The opposite end of handle 5 is attached to a ratchet wrench 9, via a flex-pivot pin 6. Flex-pivot pin 6 provides that ratchet wrench 9 can be moved, by hand, changing the angular relation to handle 5. The degree of said change is plus, or minus, ninety degrees from a horizontal plane formed by the handle 5 and wrench 9. Angular changes in flex-pivot pin 6, as conjuncted with that in universal attaching head 2, will be operationally detailed later.

Ratchet wrench 9 comprises a reverse lever 7, whereby the radial movement of a ratchet drive 11 is selectable from clockwise to counterclockwise rotation. Ratchet drive 11 therefore will drive any member attached thereon in a radial direction in response to a corresponding position of the reverse lever 7. Attachment to the ratchet drive 11 is effected by inserting and locking ratchet drive 11 into a reciprocally shaped socket cavity 12. Insertion and locking into a socket cavity is effected by means of a quick-release button 8, located on the top of ratchet wrench 9 and in front of reverse lever 7.

A quick-release button 8 is connnected internally through ratchet drive 11 to a locking ball 10. Said locking ball 10 is normally raised above the surface of ratchet drive 11. However, pressing quick-release button 8 will withdraw locking ball 10 below the surface of ratchet drive 11. Thereby ratchet drive 11 may be inserted, with resistance, into socket cavity 12. Following said insertion, quick-release button 8 is released and locking ball 10 again rises above the surface of ratchet drive 11. Indentations in the interior walls of socket cavity 12 receive locking ball 10. Thereby members are attached and locked to ratchet drive 11. And, so remain until quick-release button 8 is pressed again, thereby unlocking for purposes of detaching a member from ratchet drive 11.

Although the preceding discussion on attaching member might appear more operational than appropriate here, it later avoids repetition of a conventional item, like ratchet wrench 9. Hereto discussed has been the perferred embodiment of the drive member, and its attachment to the gripping member. That is, the union of ratchet drive 11 and socket cavity 12. As a matter of specification, it is not intended that other embodiments of the drive member are not anticipated to be conjuncted with the gripping member, discussed hereafter. Given that right half 2B could be a feature of a nonflexible ratchet wrench, or a pullhandle socket wrench, is envisioned within the scope of the current device.

Further envisioned is that any socket wrench having a drive, similar to ratchet drive 11 can cause the gripping member to operate. Likewise, it is not intended to limit embodiment by use of a telescopic long pole 1. Though not preferred, alternatively a noninsulated pole, of fixed length, is included within the scope of the current device. Similarily, the permanent, or temporary, attachment of the drive member by means other than a universal attaching head 2 is envisioned. What is stated, herein, as the perferred embodiment should not be taken as meaning either the exclusive, the minimum, or the optimal embodiment.

Figure 2:
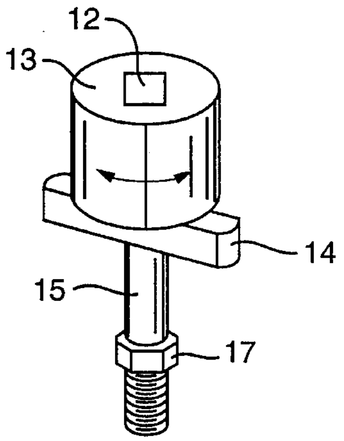
FIG. 2 is a side view showing details of the drive socket.
Figure 3:
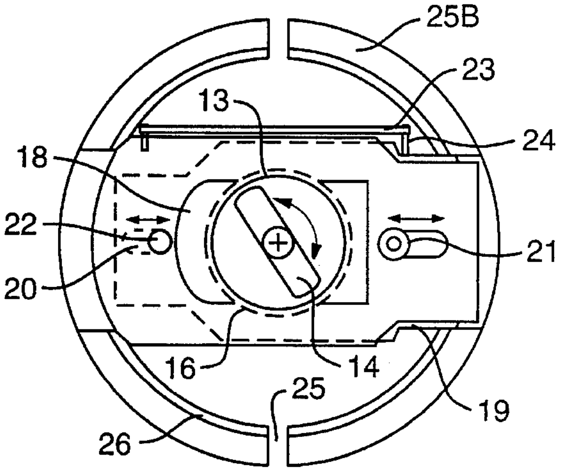
FIG. 3 is a top plan view the gripping member of FIG. 1, wherein the overlapping plates are schematically illustrated in relation to the barcam, and shows relocated contractors.

From this point, the perferred embodiment is referenced to both FIGS. 1–3. The union of ratchet drive 11 and a socket drive 13, at socket cavity 12, comprises a completed assembly of the photoelectric control module installation device. Socket drive 13 is one piece, having three distinctively shaped portions. A top portion, shaped as an upright cylinder, and having a square socket cavity 12 centered in its top surface. Extending from the center bottom surface of sprocket drive 13, a center portion is a rectangular shaped barcam 14. Said barcam 14 having a rounded end, at each end of its long axis. A bottom portion of sprocket drive 13, extending downward from the center of the bottom surface of barcam 14 is a round shaft 15. Shaft 15, having a threaded end, is passed through the center of a flatwasher 16. Having passed through the flatwasher 16, the threaded end of shaft 15 is secured with a locknut 17. Thus, retaining flatwasher 16 onto shaft 15.

Socket drive 13 is inserted into identical openings 18 within two identical overlapping plates 19. Openings 18 are rectangular, but have a contour at one end. Both the overlapping plates 19 and the openings 18, although identical are symmetrically opposed, in opposite directions, one atop the other. The bottom surfaces of the cylindrical portion of sprocket drive 13, having a plane perpendicular to the sides of barcam 14, rest on the top surface of overlapping plates 19. The diameter of the cylindrical portion is greater than width of openings 18. Nearly all of the mass of the cylindrical portion of sprocket drive 13 is, therefore, centered over openings 18. The barcam 14 portion of sprocket drive 13, having a side height equal to the combined thickness of overlapping plates 19, rest within the cavity formed by openings 18. The top surface of flatwasher 16 is opposite the bottom surface of the lower overlapping plate 19, and has a larger diameter than the width of openings 18. Thereby, when locknut 17 is attached to shaft 15, the barcam 14 portion of sprocket drive 13 is secured loosly within the combined openings 18, of overlapping plates 19.

Since overlapping plates 19 are intended to move, in and out, in opposite directions a means of directing must be provided. Therefore, overlapping plates 19 have identical elongated slots 20, parallel to their axis of intended movement. Said slots 20 are equal to the distance of intended movement of overlapping plates 19. For purposes of this illustration, slots 20 are located on the centerline of the long axis of overlapping plates 19, and perpendicular to the straight end of openings 18. However, slots 20 will function equally well when located on opposing sides of the long axis of openings 18. A rivet 21 is placed through slots 20. Rivet 21 is secured in a hole 22 in the opposing overlapping plates 19. Said hole 22 is aligned with slot 20 in the opposing overlapping plates 19. The rivet 21 head is wider than the width of slot 20, and is rivited so as to allow a slight clearence between the bottom surface of the head and overlapping plates 19. Clearence should only be sufficient to secure together overlapping plates 19, yet allow rivet 21 to freely travel the length of slot 20.

Affixed to one, or more, sides of overlapping plates 19 is an elongated elastic contractor 23. Contractor 23 is attacheted at both free ends by a stud 24. Stud 24 is extended outwardly from the side outermost edges, the opposing overlapping plates 19. Contractor 23, is stretched parallel to the long axis of the overlapping plates 19, and being attached thereon, provides constant inward tension. Preferably contractor 23 is a spring. Alternatively, a flexible strap of latex rubber, or a material having similar properties, will suffice. In a static mode the tension of contractor 23 retains overlapping plates 19, and anything affixed thereon, in a closed position. The operationl aspects of contractor 23 will be detailed later. For the purposes of the perferred embodiment, an opposing pair of grips 25 are attached to the outer ends of overlapping plates 19.

Figure 4:
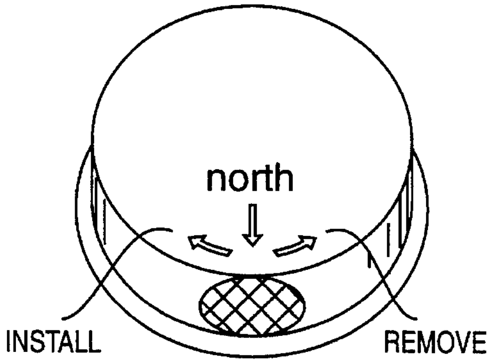
FIG. 4 is a side raised view of a modular photoelectric control switch, showing its functional relationship to the gripping member of FIG. 1.

Grips 25 form a vertically divided hollow cylinder, having equal halves rigidly affixed to overlapping plates 19. Thus, grips 25 extend downwardly, at opposing right angles, from the outermost edges of overlapping plates 19. Though nearly symmetrical, front grip 25A is slightly shorter than rear grip 25B. Purely as a matter of alternative construction, grips 25 could be affixed to overlapping plates 19 using a variety of techniques. Such techniques include bolts, screws, adhesives, and welding. Herein, the term affixed is also intended to delineate a difference in function and position of grips 25 from overlapping plates 19. It is preferred that in construction, grips 25 and overlapping plates 19 be correspondingly cast, molded, or stamped as one entity. The walls of grips 25 are shaped as semicircles and are preferred to grip rounded objects, similar to FIG. 4, objects of other various shapes can also be suitable gripped. Bonded to the entire interior surface of the walls of grips 25 is a ductile lining 26. A material such as latex rubber is preferred for lining 26 material. Alternatively most any durable material, having a slip-resistant surface under pressure, would likely be usable for lining 26. On a temporary basis, and as a possible repair material, ordinary duct tape will suffice as material for lining 26. In respect to construction materials all portions of the current device are preferred to be either low or nonelectrically conductive materials, for safety purposes.

For operation of the photoelectric control module installer, the drive member of FIG. 1 is attached to the telescopic long pole 1. A visual estimate is made of the angle from the ground level working location to the overhead modular photoelelectric control switch. To approximate that angle, and attach the drive member to the telescopic long pole 1, bolt 3 and wingnut 4 located in left half 2A of the universal attaching head 2 is loosened. Right half 2B is placed onto bolt 3 and opposes left half 2A. The two halves of universal attaching head 2 are moved radially, until the angle between telescopic long pole 1 and handle 5 approximates the visually estimated angle. When a corresponding angle is achieved, allowing for any physical obstructions, the two halves of the universal attaching head 2 are bolted together. The tightening of bolt 3 and wingnut 4 mates the splined inner surfaces of left half 2A and right half 2B. Thus the drive member is rigidly attached to telescopic long pole 1, at an appropriate angle service of an overhead modular photoelectric control switch.

To compelete assembly for operations, the gripping member is attached to the drive member. Quick-release button 8 is pushed to retract locking ball 10 in ratchet drive 11. Simultaneously, ratchet drive 11 is pushed into the socket cavity 12 located in the top of socket drive 13. When ratchet drive 11 is seated, quick-release button 8 is released. Thus the drive member and gripping are locked together, when locking ball 10 is released into the socket cavity 12. Although the term locked is used, it should be noted that if it is required, this union can be broken without pressing quick-release button 8. Separating the drive and gripping members while pressing quick-release button 8, though preferred, can be accomplished by simply pulling the two members in opposite directions. When the pulling force is sufficient, locking ball 10 is overridden and release effected. With minimal effort, sufficient pulling force can be applied by using the telescopic long pole 1, should the gripping member become entangled. This is an important safety aspect when using any device in close proximity to electricity. Nontheless,. when locked together the drive and gripping members are prepared for routine opeartions.

Prior to operations reversing lever 7, located on ratchet wrench 9, is positioned for applying drive force counterclockwise. That is, the direction required for removal of a modular photoelectric control switch of FIG. 4. Simultaneously, that position allows handle 5 to be moved in free clockwise rotation by manulipation of the telescopic long pole 1. As a final check, the grips 25 are pulled manually to the fully open position and allowed to return to the normally fully closed position. Thus, ensuring that the assembled device is operational. Controlled manually from the far end of the telescopic long pole 1, the tip end with the assembled device, of FIG. 1, is raised into position.

The rear grip 25B, being slightly longer than front grip 25A, is placed in contact with the upper side of the modular photoelectric control switch case. The bottom edge of front grip 25A will normally be in contact with the top edge of the case, on the opposing side. Using the longer portion of grip 25B, and the upper side of the case, as a point of resistance a slight forward and downward pushing motion is initiated with telescopic long pole 1. The forward inertia is transmitted by the drive member, to sprocket drive 13, and thence to flatwasher 16. Flatwasher 16 is pushed into contact with the head of rivet 21, protruding from slot 20 on the lower surface of overlapping plates 19. Being connected to the upper overlapping plate 19, through slot 20, front grip 25A is caused to extend forward. The forward pushing motion simultaneously overcomes the inward tension of contractor 23. Thereby front grip 25A is moved away from grip 25B to a distance, along the path of inertia, exceeding the diameter of the top of modular photoelectric control switch case. The downward motion of the telescopic long pole 1, thereby causes the current device to seat onto the control switch case. In many control switch cases, having a smaller top than bottom diameter, only a slight downward inertia is required to seat the current device.

When the pushing motion is discontinued, the elastic tension of the contractor 23 will pull overlapping plates 19 inward. Hence affixed grips 25are pulled snug against the outer walls of switch case. Once seated, grips 25 will lower the amount of light striking the photoelectric sensor to a level below the designed threshold. Even when the space between front grips 25A and 25B are incident to the sensor, the light level is sufficiently beneath the threshold to cause switching. If the modular photoelectric Control does not switch according to visual and audible indications, it has failed to test operationally and is removed. If the modular photoelectric control functions normally, the current device is removed with a simple upward motion of telescopic long pole 1.

If removal of the modular photoelectric contol switch is indicated by testing, it is unlocked from its receptacle by short alternating left and right motions of the telescopic long pole 1. Since the reverse lever 7 was placed in a position to drive counterclockwise, before beginning testing, the ratchet drive 11 rotates counterclockwise. Movement of the drive member counterclockwise causes sprocket drive 13, and therefore, barcam 14 to rotate in the same direction. When grips 25 and overlapping plates 19 and openings 12 moved outwardly, in seating, their symmetrical opposites moved in opposite directions. The effect of that movement on openings 18 was to bring the straight opposing ends closer together. Barcam 14 cannot rotate freely now, because the relative size of openings has decreased.

Now, when barcam 14 moves counterclockwise, responding to movement of the drive member on sprocket drive 13, its ends contact the contracted and opposite ends of openings 18. Contact with the ends of barcam 14, as it attempts to rotate, forces the edges of openings 18 inwardly. Correspondingly, both overlapping plates 19 and grips 25 are forced inwardly. The inward direction creates increased force, or gripping pressure, on any object larger than the normally closed diameter of grips 25. When securely gripped that object will tend to rotate in the counterclockwise with the gripping member. That is, unless slippage prevents an effective gripping action. The combined effects of contractor 23 and the traction of lining 26 combine to provide a means of preventing torque from being lost by slippage, until grip becomes an effective force. Without the initial resistance provided by contractor 23, and lining 26, the grips 25 will merely rotate freely and counterclockwise.

When securely gripped, the case of the modular photoelectric control is rotated approximately thirty degrees, by ratchet action. When the modular photoelectric control cannot be further rotated counterclockwise, it is unlocked and free to move from its receptacle. Removal is effected by an upward motion of telescopic long pole 1. While the modular photoelectric control is lowered to ground level, it remains securely gripped. Contractor 23 and lining 26 provide sufficient inward force to maintain grips 25 in a constant position. Additionally, the sprocket drive 13 tends to be mechanically resistant to movement unless initiated by the drive member.

Prior to pulling a faulty modular photoelectric control switch from grips 25, the relative position is noted. A replacement control is pushed into grips 25 in the same position, to assist in positioning electrical contacts into the receptacle. Unless the workstation has changed, it should not be necessary to readjust the angle of universal attaching head 2. Minor changes in angle can be made by manually moving rachet wrench 9, up or down, at the flex-pivot pin 6. Reverse lever 7, however, must be switched to the opposite position. Switching reverse lever 7 will effect clockwise rotation for installation, in the reverse manner of counterclockwise rotation for removal.

Should a change in workstation be required, the current device is omnidirectional. Given that the current device can be used with equal effectiviness in any location, from which the overhead control module is not blocked by obstruction in the line of sight. The current device has no features which limits its access. Given the combined flexibility of the universal attaching head 2, the flex-pivot pin 6, and the human arm, the current device can be adjusted to assimilate a complete circular flexibility along any radiant from universal attaching head 2. In theory, the current device can even compensate for the existance of telescopic long pole 1. In most all operations, no more than arms length movement is ever required.

While it might appear difficult to install a modular photoelectric control into its receptacle, the task is assisted by the receptacle. A standard receptacle has a slightly raised circle around its electrical contact slots. The raised circle is designed to fit beneath the weather collar around the base of a standard modular photoelectrical control switch. While the receptacle and the three-pronged plug under the control switch are often obstructed from view, the raised circle assist the installer in locating the receptacle by feel and available visual references. Remember that the replacement control was placed into grips 25 in the same position as the removed control switch. Once the raised circle of the receptacle is located only minor adjustments, by arm movement, should be required to mate the plug prongs and the receptacle slots. Actually, the plug prongs and the slots are mostly self-seating, requiring only a slight downward movement of the telescopic pole 1. Twist locking of the modular photoelectric control switch, is operationally and mechanically the exact reverse of removal. As to the degree of manual skills required to utilize the current device, remember that electrical repairmen are routinely expected to extract and install cotter keys by use of another device attached to a telescopic long pole 1.

To remove a light bulb with the current invention, the previously described method of adjusting universal attaching head 2 until a straight is formed between handle 5 and telescopic long pole 1. Ratchet wrench 9 is manually adjusted to be perpendicular to handle 5 via flex-pivot pin 6. Reverse lever 7 is a set counterclockwise drive for removal of a bulb. The current invention is raised directly below, and contacting the bulb. The end shapes of most high intensity lights associated with overhead lighting, will,spread grips 25 allowing them to seat onto the bulb. Any resistance of lining 26 and the bulb surface is normally overcome by a wiggling and pushing motion of telescopic long pole 1. Extraction is accomplished by a twisting motion of telescopic long pole 1. Manually the insertion of a bulb is the exact reverse of the removal. Mechanical operation of the current device is exactly the same as the aforementioned operation for modular photoelectric control switches. While the current device cannot remove broken bulb bases, it is envisioned that a device similar to the one currently used as an attachment could be adapted to use with the current device. All that would be required is fitting the device with base suitable for inserting into grips 25.

In summary, the innovation of the photoelectric control module install device provides a safe, reliable, and economical method of performing test, removal, and installation of overhead photoelectric control switches into a single integral device. While the above description contains specifics, these should not be construed as limiting the scope of the device. Rather, the above description is but one preferred embodiment of having other utilities. For example, possible modification to adapt a variety of associated devices having basically round bases and being attached via the grips of the current device. Accordingly, the scope of the preferred device cannot be determined by a single embodiment, but rather in conjunction with the appended claims and their equivalents.

What I claim is:

1. A gripping device for installing and replacing photoelectric control modules, said photoelectric control modules being selected from a group consisting of overhead photoelectric control modules and overhead light bulbs, said device comprising:

a gripping member having a pair of opposing, rotatable grips, said grips having a ductile lining affixed to an inner surface of each of said grips for gripping said photoelectric control modules;

a pair of overlapping plates each having an end attached to a top end of each of said grips, said plates being slidably mounted with respect to each other and having at least one elongated elastic contractor affixed to each side of each of said plates for inwardly tensioning said plates, said plates further having openings with one end of a rotatable barcam disposed therein for expanding, contracting and rotating said plates and said grips, the opposite end of said barcam having a cavity for attaching an interconnected drive member thereto;

said drive member having a first end, a flexible head ratchet wrench with a reversible ratchet drive disposed at said first end and having a handle with a distal end extending therefrom, said ratchet drive being removably attached to said cavity of said barcam, said ratchet wrench further having a universal attaching head, said attaching head having adjustable mated splines disposed at one end thereof for affixing to said distal end of said handle, the opposite end of said attaching head having a telescopic pole attached thereto for operating said drive member and said gripping member.

2. The gripping device as recited in claim 1, wherein said grips are slidably positioned over said control modules for reducing the light striking a sensor of said control modules to thereby determine whether said control modules are malfuntioned prior to rotatably gripping said modules by said grips.

3. The gripping device as recited in claim 1, wherein said handle is pivotally attached to said wrench by a pivot pin for omnidirectional accessing to said modules.

* * * * *